Figure 1:
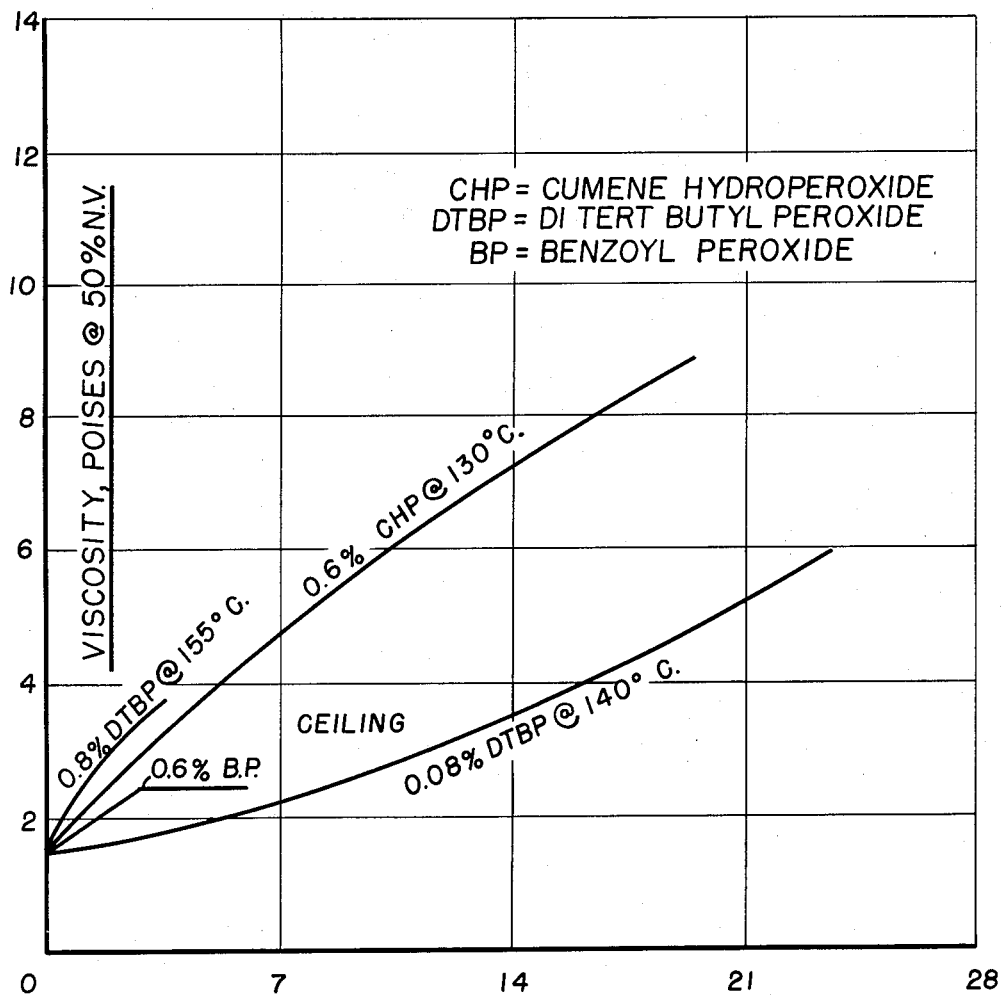

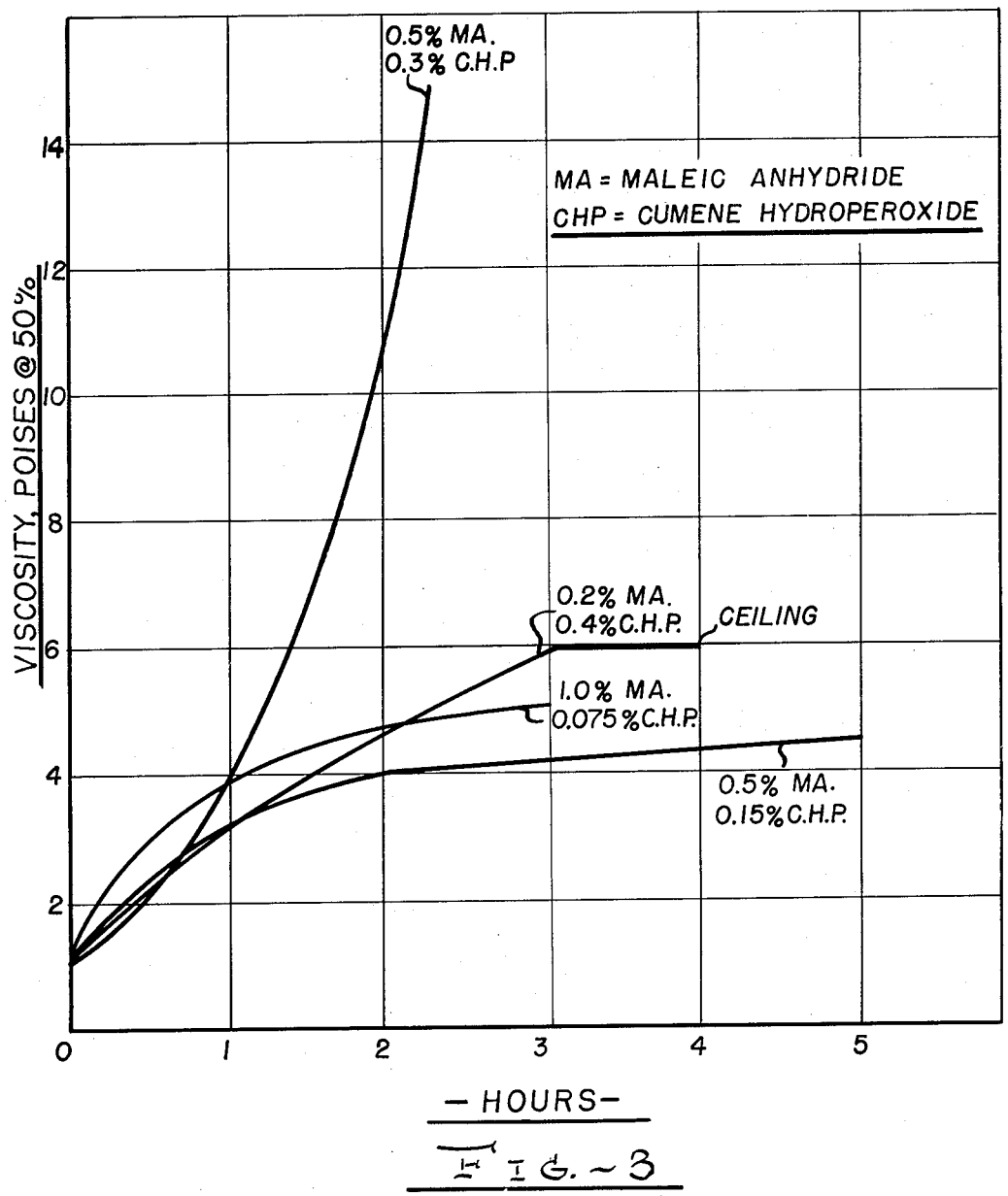

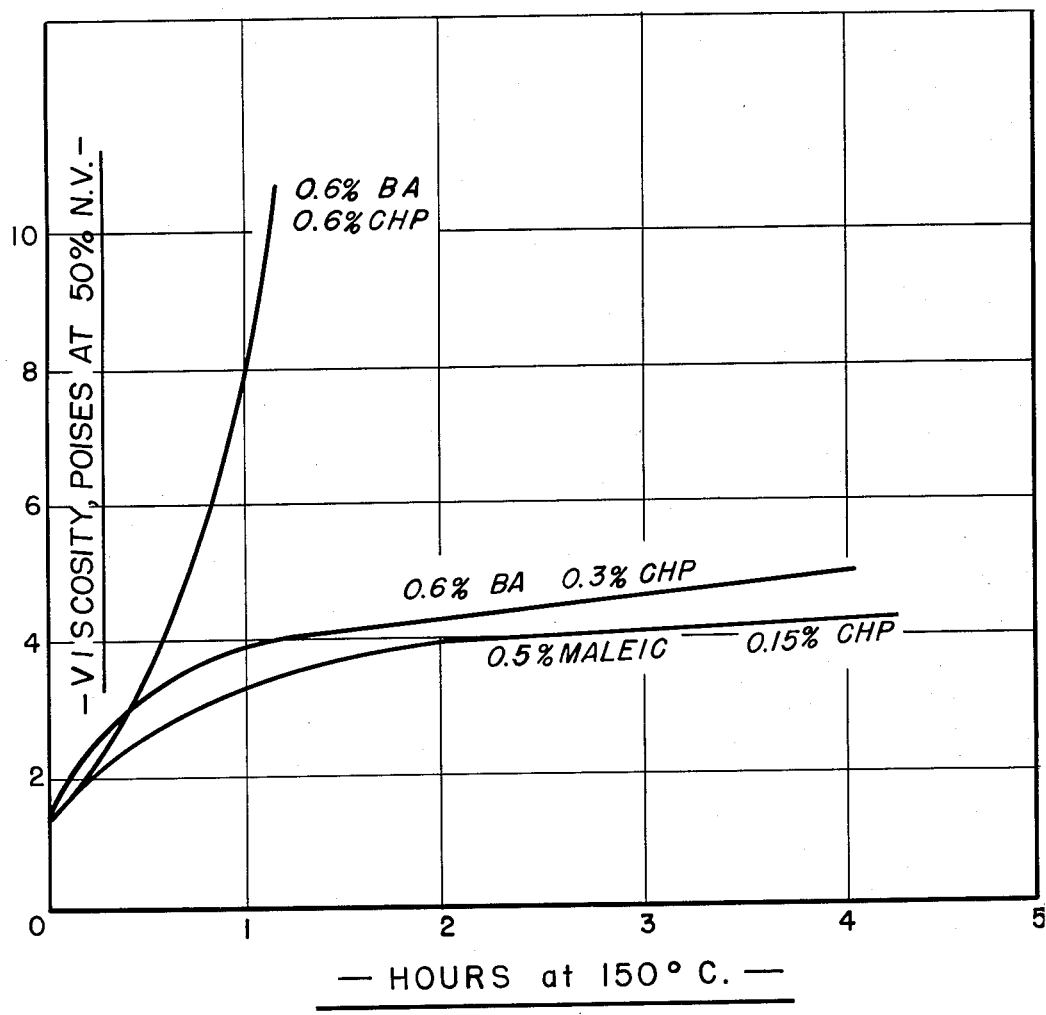

2,753,385

United States Patent Office

Patented July 3, 1956

2,753,385

MODIFIED SYNTHETIC DRYING OIL

Anthony H. Gleason, Westfield, N. J., assignor to Esso Research and Engineering Company, a corporation of Delaware Application September 30, 1952, Serial No. 312,282

5 Claims. (Cl. 260—669)

This invention relates to an improvement in drying rate of certain siccative diolefin polymers. In particular, the invention is concerned with a heat treatment for drying oils prepared by copolymerization of 75 to 85% butadiene and 25 to 15% styrene.

This application is a continuation-in-part of Serial No. 106,487, now U. S. Patent 2,683,162.

The preparation of synthetic drying oils by polymerizing butadiene-1,3 or especially by copolymerizing 75 to 85% butadiene-1,3 and 25 to 15% styrene with the aid of metallic sodium and in the presence of an inert hydrocarbon diluent, and preferably also in the presence of a promoter or modifier such as dioxane-1,4 or diethyl ether, is described and claimed in co-pending application Serial No. 176,771 of Anthony H. Gleason. In the manner described a suitable polymeric drying oil can be produced which, when dissolved in an equal weight of a hydrocarbon solvent such as mineral spirits having a boiling range of 300°–400° F., generally has a viscosity between about 0.15 and 10 poises, which corresponds to an intrinsic viscosity of about 0.08 to 0.3 for the pure polymer. Where the polymeric oil is to be used in concentrated form, e. g., 70 to 100%, it is obviously desirable that the polymer have a viscosity in the lower range of those disclosed above. The desired viscosity of the polymer can be controlled by an appropriate change in synthesis temperature and catalyst and monomer concentration. Polymers in the lower viscosity range are usually more readily prepared, but they have been found to suffer from an unduly slow drying rate. Polymers synthesized in the higher viscosity range have slightly improved drying rates, but further improvement in drying rate has been found to be desirable regardless of the viscosity range.

An improvement has been effected by synthesizing the oil to a lower voscosity than ultimately desired and subsequently heat bodying the oil at temperatures between 175° and 275° C. to the final desired viscosity as described and claimed in Serial No. 176,772, filed July 29, 1950, now U. S. Patent 2,672,425, for Anthony H. Gleason and Robert F. Leary. However, the use of such high temperatures is frequently undesirable due to the danger of overbodying, and the bodying rates are hard to control. As the viscosity of the polymer increases, the rate of bodying increases. Eventually the rate becomes very fast at the viscosity level desired and consequently there is danger of overbodying in commercial plants where instantaneous control is not always exercised. Attainment of the high temperature is expensive since available high pressure steam is not hot enough.

It has now been discovered that the desired viscosity on heat bodying and the improved drying rates can be obtained at lower temperatures by the addition to the synthetic drying oil of minor quantities of a suitable organic peroxide and heating at temperatures of 100–175° C.

The drying oils to which the present invention is primarily applicable are those prepared by copolymerizing 75 to 85 parts of butadiene-1,3 and 25 to 15 parts of styrene. The polymerization is carried out in a reaction diluent at temperatures ranging from about 25 to 95° C., or preferably between 40 and 90° C., and is desirably continued until complete conversion of monomers is obtained. About 1.2 to 5 parts, preferably 1.5 to 4 parts, of finely divided metallic sodium per 100 parts of monomers are used as catalyst. Materials used as diluents in the polymerization are inert hydrocarbons which remain liquid under the reaction conditions employed. Accordingly, the diluents employed have a boiling point between about 10 and 200° C., the low boiling diluents being useful where it is permissible to keep the reaction pressure sufficiently high to maintain the diluent in liquid condition at the reaction temperature used.

Preferred diluents are essentially aliphatic hydrocarbons such as naphtha having a boiling range between about 90 and 120° C., or straight-run mineral spirits such as "Varsol" having a boiling range between about 150 and 200° C. Butane, benzene, cyclohexane, xylenes, toluenes, pentanes and similar inert hydrocarbons are also useful, individually or in admixture with each other. The hydrocarbon diluents are used in amounts ranging from 100 to 500, and preferably 150 to 300 parts per 100 parts of monomers. In other words, the resulting drying oil composition as synthesized normally contains about 20 to 50% of the siccative polymer dissolved in a hydrocarbon solvent. When desired, more concentrated drying oil compositions can be produced from the synthesis product by stripping off excess solvent. For purposes of the present invention, it is desirable to concentrate non-volatile matter, i. e. the polymer content of the drying oil composition, to a concentration between 40 and 100%, preferably 50 to 90%, prior to subjecting it to the heat treatment. The use of less concentrated solutions is also feasible, but less improvement is obtained for a given amount of catalyst and time of heating.

Furthermore, to promote the reaction and to assure the formation of a product of proper clarity, viscosity and drying rate, it is also desirable to employ in the polymerization about 1 to 100 parts of an ether promoter per 100 parts of monomers. Cyclic diethers of 4 to 8 carbon atoms having an —O—C—C—O— group, such as dioxane-1,4 and its methyl and ethyl homologues, have been found as particularly effective promoters. Other suitable ether promoters are aliphatic mono- or di-ethers of 4 to 8 carbon atoms, such as diethyl ether, diethyl ether of ethylene glycol, and diethyl ether of diethylene glycol. Finally, it is also beneficial in many cases, although not essential, to use about 5 to 35 weight per cent (based on sodium) of an alcohol such as methanol, isopropanol or n-amyl alcohol, especially where the sodium catalyst particles are relatively coarse.

The present invention is based on the discovery that when drying oils of the nature described above are heated in the presence of 0.05 to 1.0% by weight on an organic peroxide, the temperature at which a suitable increase in viscosity occurs can be lowered to 100–175° C. Suitable peroxides include: benzoyl peroxide; cumene hydroperoxide; acetyl peroxide; t-butyl hydroperoxide and its esters, such as t-butyl perbenzoate; methyl ethyl ketone peroxide; t-butyl peroxide; and bis (t-butyl peroxy) butane.

These peroxides, when used in the proper concentration, will generally give a viscosity ceiling which is obviously advantageous from the standpoint of overbodying. By ceiling is meant the leveling off of the bodying curve with time, frequently reaching a constant value beyond which heating no longer increases the viscosity. This is assumed to occur when the peroxide is completely used up.

The values given above for the concentrations of peroxide are somewhat arbitrary and will depend considerably on reaction conditions. Peroxide concentration will depend on degree of polymer dilution, the viscosity ceiling desired, and to some extent on the molecular weight of the peroxide being used.

It may also be desirable to carry out the heating step in the additional presence of 0.01 to 2.5% by weight, preferably 0.1 to 1/0%, of promoters such as an anhydride of an unsaturated dicarboxylic acid, for example, maleic anhydride, chloro-maleic anhydride, and citraconic anhydride; esters of acrylic, methacrylic, fumaric, cinnamic, crotonic, and vinyl acetic acids, as well as acrylonitrile, are also suitable.

Thus the present invention covers a method of preparing a drying oil of suitable viscosity having desired drying properties which comprise synthesizing the oil as above described except that the synthesis conditions are chosen so that the viscosity at 100% conversion is lower than that ultimately desired. The catalyst is then removed and the oil heated to a temperature of 100 to 175° C. in the presence of one of the above peroxides with or without one of the above promoters.

The following specific examples are presented to illustrate typical applications and effects of the present invention. All quantities in this specification are expressed on a weight basis unless otherwise specified.

*Example 1*

A 2-liter, stainless steel reactor was charged with 80 parts of butadiene-1,3, 20 parts styrene, 200 parts of straight-run mineral spirits having a boiling rangs of 150 to 200° C., 20 parts of dioxane-1,4, 1.5 parts of finely dispersed metallic sodium and 0.2 part of isopropanol. After closing the reactor, this reaction mixture was heated with agitation at 50° C. for 10 hours, whereby complete conversion of monomers was obtained. After cooling to room temperature, the sodium was destroyed by adding glacial acetic acid to the reaction mixture, excess acid was neutralized with ammonia and the resulting salts were separated by filtration. After stripping off part of the solvent, a solution of polymer was obtained having a viscosity of 1.2 poises consisting essentially of equal parts of a viscous butadiene-styrene copolymer and mineral spirits. 0.04 part of cobalt naphthenate and 0.04 part of manganese naphthenate (based on the copolymer) were added to the resulting drying oil, the latter was then poured on thin steel panels to form thin coatings. The oil proved to be rather slow drying, the test panel being very sticky after an exposure of 6 hours at room temperature.

Samples of the same drying oil consisting of 90% solids and 10% solvent were treated in accordance with the present invention by heating 550 grams at 150° C. for various lengths of time with one gram maleic anhydride (0.2% based on oil) and 2.0 ml. of 46% cumene hydroperoxide with the following results:

| Heating Time @ 150° C. | Viscosity @ 50% N. V. M. | |
|---|---|---|
| | Heat-Treated Only | Maleic Anhydride plus Cumene Hydroperoxide, Poises |
| 0 hrs | 1.2 | 1.2 |
| 1 hr | 1.2 | 2.2 |
| 2 hrs | 1.2 | 2.6 |
| 3 hrs | 1.2 | 2.6 |

After dilution with mineral spirits (B. P. 150–200° C.) to a polymer concentration of 50%, the same amounts of cobalt and manganese naphthenate driers were added to both of the heat treated samples, as in the case of the unheated control described previously. The samples heated for three hours were found to exhibit the same tackiness after 6 hours of drying as did the original unheated oil.

*Example 2*

A drying oil was prepared as in Example 1 and then heat bodied as therein described except that twice as much of the cumene hydroperoxide was used and the reaction continued for 4 hours. The results are given below:

| Heating Time (150° C.) | Viscosity @ 50%N.V.M., Poises |
|---|---|
| 0 hrs | 1.2 |
| 1 hr | 2.7 |
| 2 hrs | 4.3 |
| 3 hrs | 5.8 |
| 4 hrs | 5.9 |

A poured film of the 4 hour product containing the naphthenate driers of Example 1 was dust-free in 6 hours.

*Example 3*

A drying oil was again prepared as in Example 1 and then heat bodied in the presence of a small amount of various reactive constituents and at different temperatures for varying periods of time and in the presence of different peroxides. The same amounts of cobalt and manganese naphthenate driers were added to the heat treated samples as in Example 1. The following data were obtained:

| Reactive Constituents | Time, Hrs. | Temp., ° C. | Vis./ 50% | Drying Rate, Hours | | | | | Cat. |
|---|---|---|---|---|---|---|---|---|---|
| | | | | 1 | 2 | 4 | 6 | 24 | |
| Control | | | 1.5 | 8 | 8 | 8 | 8 | 0 | |
| 0.5 Maleic Anhydride | 3 | 150 | 4.8 | 8 | 8 | 5 | 3 | 0 | 0.15% CHP.[2] |
| 1.0 Maleic Anhydride | 3 | 150 | 6.0 | 8 | 8 | 5 | 3 | 0 | 0.075% CHP. |
| 0.3 B. A.[1] | 4 | 150 | 5.0 | 8 | 8 | 4 | 2 | 0 | 0.3% CHP. |
| None | 24 | 145 | 6.0 | 8 | 7 | 3 | 1 | 0 | 0.08% DTBP.[3] |
| Do | 3 | 150 | 5.0 | 8 | 8 | 4 | 1 | 0 | 0.6% CHP. |
| 0.2 Maleic Anhydride | 6 | 230 | 6.0 | 8 | 8 | 5 | 3 | 0 | None. |

[1] B. A.—butyl acrylate.
[2] CHP—cumene hydroperoxide.
[3] DTBP—diteritary butyl peroxide.
9=wet; 8=very sticky; 7=film just clings to finger; 6=set to touch; 3=tacky, but dust free; 0=tack free.

The above data illustrate the fact that the viscosity of the drying oil can be increased to the desired level at a much lower temperature than when heat alone is employed as the bodying agent.

*Example 4*

Separate samples of a drying oil having a viscosity of 1.5 poises at 50% dilution with Varsol and prepared as in Example 1 were heated at various temperatures with varying amounts of tertiary butyl perbenzoate and tertiary butyl hydroperoxide. The following data were obtained:

| Peroxide | Conc., Percent, on Polymer | Temp., °C. | Vis. in poise at 50% N. V. after X hours' heating | | | |
|---|---|---|---|---|---|---|
| | | | 1 Hr. | 2 Hrs. | 4 Hrs. | 6 Hrs. |
| t Bu perben | 0.27 | 125 | 2.1 | 2.8 | 3.4 | |
| t Bu perben | 0.27 | 130 | | 3.1 | 3.4 | 3.6 |
| t Bu perben | 0.40 | 130 | | 2.7 | 3.1 | gel. |
| t Bu hydroperoxide | 0.33 | 110 | 1.6 | 1.8 | 2.0 | |
| | 0.40 | 110 | | 1.7 | 1.9 | 2.1 |
| | 0.65 | 110 | | 1.7 | 1.8 | 2.0 |

Using the perbenzoate at the above concentrations and temperatures gives curves which approach a ceiling. This peroxide is useful when it is desired to moderately increase the viscosity of the polymer. The lower concentration of the perbenzoate gave the most desirable results.

Figure 2:
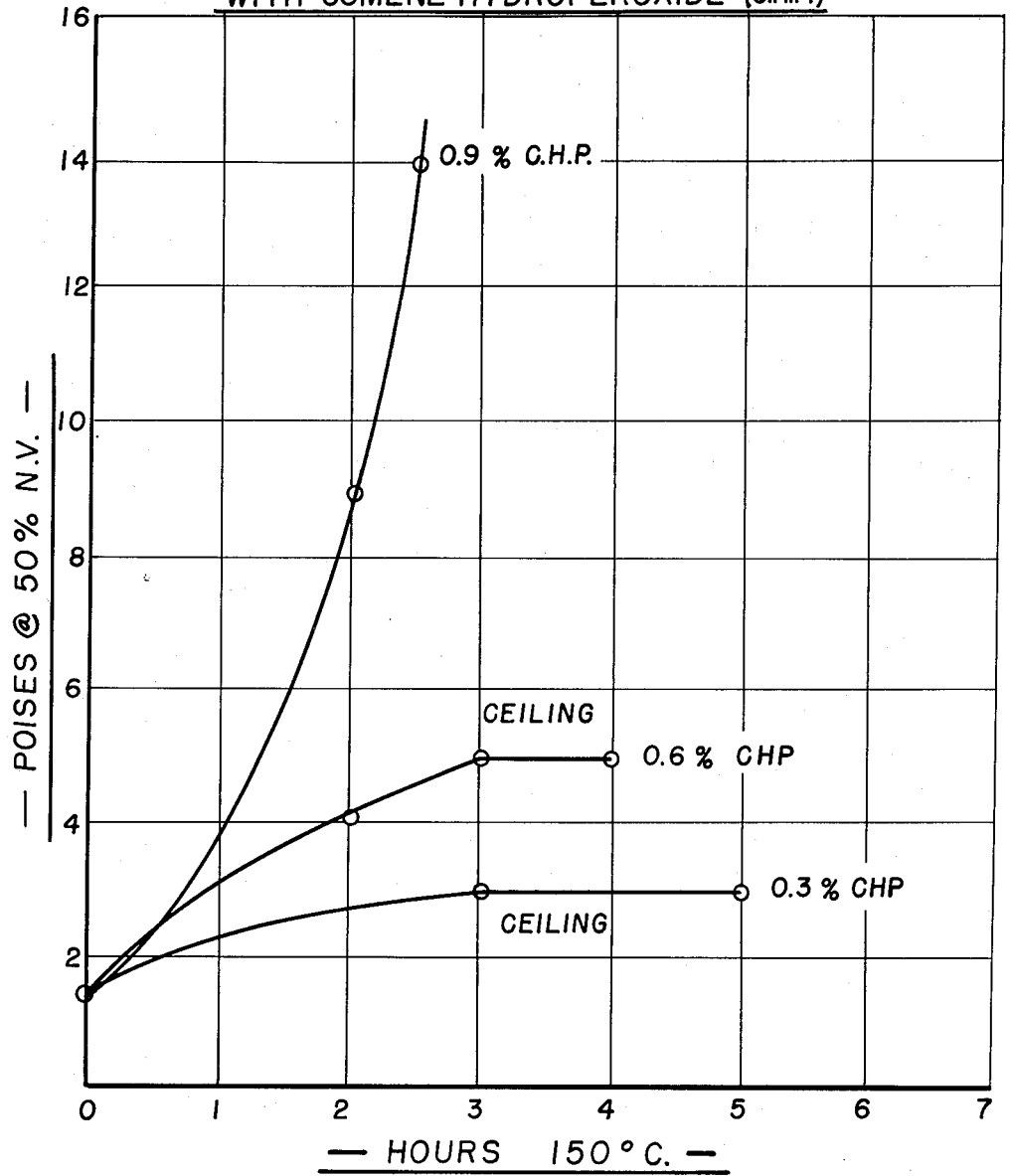

As pointed out above, a maximum viscosity level is often reached which is dependent on the concentration of the peroxide used. This effect is clearly shown in the curves of Figures 1–4, where the rate of increase in viscosity with time is shown for several peroxides with and without the presence of promoters. This maximum level is quite important as it prevents overbodying which might occur at higher temperatures in the absence of the peroxide. In those cases where a maximum viscosity was not reached in the presence of a peroxide, it is to be noted that the rate of viscosity increase is far less than that occurring with high temperature thermal bodying, as shown in Serial No. 176,772, now U. S. Patent No. 2,672,425, above mentioned. The improvement in drying rate noted for the product in Example 2 is also accompanied by an appreciable increase in the water and soap resistance of dried films which have been aged one week.

The nature of the present invention having been thus fully set forth and specific examples of the same given, what is claimed as new and useful and desired to be secured by Letters Patent is:

1. A process for preparing a drying oil which comprises copolymerizing a mixture of from 75 to 85% of butadiene and 25 to 15% of styrene in 150 to 300 parts of a hydrocarbon diluent per 100 parts of monomers and 10 to 40 parts of an ether chosen from the group consisting of mono and diethers having 4 to 8 carbon atoms and cyclic diethers having 4 to 8 carbon atoms and having an O—C—C—O group in the molecule in the presence of 1.2 to 4 parts of finely divided metallic sodium based on monomers at a temperature between 40 and 90° C., continuing the polymerization until substantially 100% conversion is obtained whereby a product is obtained which has a viscosity somewhat less than that ultimately desired, stopping the polymerization by killing and removing the catalyst, and then heating the product at a temperature between 100 and 175° C. in the presence of an organic peroxide until a drying oil having the desired viscosity is obtained.

2. Process according to claim 1 in which the peroxide is selected from the group consisting of cumene hydroperoxide, ditertiarybutyl peroxide, and tertiary butyl hydroperoxide.

3. Process according to claim 1 in which the peroxide is cumene hydroperoxide.

4. Process according to claim 1 in which the peroxide is ditertiarybutyl peroxide.

5. Process according to claim 1 in which the ether is para-dioxane.

References Cited in the file of this patent

UNITED STATES PATENTS

| | | |
|---|---|---|
| 1,886,586 | Rankin | Nov. 8, 1932 |
| 2,252,333 | Rothrock | Aug. 12, 1941 |
| 2,527,768 | Schulze et al. | Oct. 31, 1950 |
| 2,549,539 | Sparks et al. | Apr. 17, 1951 |
| 2,581,094 | Gleason et al. | Jan. 1, 1952 |
| 2,669,526 | Koenecke et al. | Feb. 16, 1954 |
| 2,683,162 | Gleason | July 6, 1954 |

OTHER REFERENCES

Marvel et al.: Jour. of Polymer Science, vol. 1, pages 275–278 (April 1946. 14 pages, page 277 only is relied on).

Cragg: Jour. of Colloid Science, vol. 1, pages 261–269 (9 pages), May 1946.

Kloetzel: Organic Reactions, vol. IV, pages 2, 4 (2 pages). Published by John Wiley and Sons, New York (1948).